(12) United States Patent
Peterson

(10) Patent No.: US 6,464,860 B1
(45) Date of Patent: Oct. 15, 2002

(54) PROCESS AND APPARATUS FOR GENERATING CARBON MONOXIDE AND EXTRACTING OIL FROM OIL SHALE

(76) Inventor: Oren V. Peterson, 1250 W. 2600 North, Pleasant Grove, UT (US) 84062

( * ) Notice: Subject to any disclaimer, the term of this patent is extended or adjusted under 35 U.S.C. 154(b) by 0 days.

(21) Appl. No.: 09/610,842

(22) Filed: Jul. 5, 2000

(51) Int. Cl.[7] ............................. C10G 1/00; C01B 31/18
(52) U.S. Cl. ...................... 208/400; 208/427; 423/418.2
(58) Field of Search ................................ 208/400, 427; 423/418.2

(56) References Cited

U.S. PATENT DOCUMENTS

| | | | |
|---|---|---|---|
| 2,128,262 A | * | 8/1938 | Newman .................. 423/418.2 |
| 2,664,389 A | * | 12/1953 | Rex et al. ...................... 201/33 |
| 3,503,868 A | | 3/1970 | Shields |
| 3,652,447 A | | 3/1972 | Yant |
| 3,941,423 A | | 3/1976 | Garte |
| 4,028,222 A | | 6/1977 | Prull |
| 4,040,976 A | * | 8/1977 | Greene ........................ 252/373 |
| 4,304,656 A | | 12/1981 | Lee |
| 4,357,231 A | | 11/1982 | Estes et al. |
| 4,505,809 A | | 3/1985 | Brunner et al. |
| 4,536,278 A | | 8/1985 | Tatterson et al. |
| 4,544,477 A | | 10/1985 | Taylor |
| 4,545,622 A | | 10/1985 | Yang |
| 4,548,702 A | | 10/1985 | York et al. |
| 4,670,104 A | | 6/1987 | Taylor |
| 4,994,175 A | | 2/1991 | Hargreaves et al. |
| 5,009,770 A | | 4/1991 | Miller et al. |

FOREIGN PATENT DOCUMENTS

| | | | |
|---|---|---|---|
| CN | 1119734 A | * | 4/1996 |

* cited by examiner

Primary Examiner—Walter D. Griffin
(74) Attorney, Agent, or Firm—Clayton, Howarth & Cannon, P.C.

(57) ABSTRACT

A process and apparatus for extracting oil from oil shale. Crushed oil shale is transported into a combustion chamber, along with relatively pure oxygen and carbon monoxide which are combusted to heat the oil shale sufficiently to release petroleum hydrocarbons, leaving a retorted oil shale containing a carbon residue. The combustion phase combines with the carbon residue to generate a recurring combustion/reaction cycle in which the carbon monoxide and oxygen are combusted to form carbon dioxide while retorting the oil shale by heat, and the carbon dioxide reacts with the carbon residue in the retorted oil shale to regenerate a carbon monoxide by-product. The petroleum hydrocarbons are cooled and processed into useable oils. The carbon monoxide by-product can be re-routed back to the combustion area of the combustion chamber and reused, or used in some separate application. Heat from the released petroleum and carbon monoxide by-product can be transferred back to the combustion chamber and also reused. The combustion chamber is preferably sealed, which combines with the use of relatively pure oxygen to prevent nitrogen and other non-essential gases from inhibiting the combustion/reaction cycle.

59 Claims, 1 Drawing Sheet

PROCESS AND APPARATUS FOR GENERATING CARBON MONOXIDE AND EXTRACTING OIL FROM OIL SHALE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. The Field of the Invention

The present invention relates generally to oil production, and more particularly, but not necessarily entirely, to a process and apparatus for liberating oil from oil shale, while generating excessive volumes of carbon monoxide.

2. Description of Related Art

The concept of releasing oil from oil shale is well known. "Oil shale" is a naturally occurring sedimentary rock, typically a black or dark brown shale or silt-stone, that is rich in petroleum hydrocarbons, and other materials generally associated with the definition of the broad term "petroleum," "kerogen" or "bitumen," from which shale oil can be obtained. The shale oil is produced from the petroleum hydrocarbons, and released from the shale, through pyrolysis, which refers to the subjection of the oil shale to very high temperatures. The petroleum hydrocarbons are released initially in gaseous form. After being cooled they are bituminous-like in form, as they will not flow unless heated to about 400° or more.

Producing commercial quantities of oil from oil shale remains cost prohibitive. The world continues to procure fuel oil by pumping crude oil from natural reserves, and refining the crude. Rapid increases in the price of crude oil, and the continued depletion of our natural oil reserves, may change that.

Large quantities of oil shale reside throughout the world. In the United States, substantial oil shale deposits are found in Colorado, Utah, Wyoming and Texas. The usual process of releasing oil from the oil shale, though it has been cost prohibitive from a commercial standpoint, comprises mining the shale, crushing it, and conducting pyrolysis by subjecting the crushed shale to heat at temperatures of 1000° F. –1400° F. The pyrolysis phase is conducted in the form of "destructive distillation," a process by which organic substances such as oil shale, wood or coal are decomposed by heat in the absence of air and distilled to produce useful products, in this case, oils. Other products such as coke, charcoal and gases are also the result of destructive distillation.

The liberation of oil from the oil shale by destructive distillation causes considerable coking of the oil shale residue, leaving behind a "retorted oil shale." The term "coking" refers to the production of coke, which is the solid residue of impure carbon obtained from carbonaceous materials such as oil shale, bituminous coal and the like, after removal of volatile material by destructive distillation.

The phrase "retorted oil shale," as used herein, is a form of coke, and refers to oil shale that has been subjected to destructive distillation to liberate the petroleum hydrocarbons, or oils, leaving an inorganic residue containing carbon. Therefore, the phrases "retorted oil shale," "carbon residue," and "carbon containing material," as used herein, are related in meaning, and as used herein, are interchangeable.

The phrase "spent oil shale," as used herein, refers to oil shale from which petroleum hydrocarbons and carbon have been removed.

The term "fluid," as used herein, shall refer broadly to both liquids and gases.

Attempts have been made in the prior art to improve upon the process of liberating oil from oil shale. Many such attempts are described in the following U.S. patents, which are incorporated herein by reference: U.S. Pat. No. 4,028,222 (granted Jun. 7, 1977 to Prull); U.S. Pat. No. 3,503,868 (granted Mar. 31, 1970 to Shields); U.S. Pat. No. 4,548,702 (granted Oct. 22, 1985 to York et al.); U.S. Pat. No. 4,536,278 (granted Aug. 20, 1985 to Tatterson et al.); U.S. Pat. No. 4,505,809 (granted Mar. 19, 1985 to Brunner et al.); U.S. Pat. No. 4,304,656 (granted Dec. 8, 1981 to Lee); U.S. Pat. No. 3,652,447 (granted Mar. 28, 1972 to Yant); U.S. Pat. No. 3,941,423 (granted Mar. 2, 1976 to Garte); and U.S. Pat. No. 4,357,231 (granted Nov. 2, 1982 to Estes et al.).

It is noteworthy that none of the prior art known to applicant provides an apparatus or method that optimizes the use of heat, and the reactants in the combustion cycle, in a more efficient manner. There is a long felt need for a destructive distillation process applicable to oil shale that is capable of (i) employing a recurring combustion/reaction cycle for a longer period of time by minimizing the presence of nonessential gases, (ii) recovering unused heat instead of permitting the heat to escape into atmosphere, and (iii) reusing and regenerating some of the reactants in the process.

The prior art is thus characterized by several disadvantages, or long-felt needs, that are addressed by the present invention. The present invention minimizes, and in some aspects eliminates, the above-mentioned failures, and other problems, by utilizing the methods and structural features described herein.

BRIEF SUMMARY AND OBJECTS OF THE INVENTION

It is therefore an object of the present invention to provide a process and apparatus for extracting oil from oil shale that is simple in design and operation.

It is another object of the present invention, in accordance with one aspect thereof, to provide such an apparatus that can produce an excess of carbon monoxide for use as a commercial fuel in other industries.

It is an additional object of the present invention, in accordance with one aspect thereof, to provide such an apparatus that minimizes the presence of gases that are nonessential to the extraction of oil from oil shale.

It is a further object of the present invention, in accordance with one aspect thereof, to provide such an apparatus that is capable of recovering unused heat produced in a combustion phase of the oil extraction process.

It is an additional object of the invention, in accordance with one aspect thereof, to provide such an apparatus in which a reactant in the process is regenerated and is reusable in the process.

The above objects and others not specifically recited are realized in a specific illustrative embodiment of a process and apparatus for extracting oil from oil shale. Crushed oil shale is transported into a combustion chamber, along with relatively pure oxygen and carbon monoxide which are combusted to heat the oil shale sufficiently to release petroleum hydrocarbons, leaving a retorted oil shale containing a carbon residue. The products of the combustion phase combine with the carbon residue to generate a recurring combustion/reaction cycle in which the carbon monoxide and oxygen are combusted to form carbon dioxide while retorting the oil shale by heat, and the carbon dioxide reacts with the carbon residue in the retorted oil shale to regenerate a carbon monoxide by-product. The petroleum hydrocarbons are cooled and processed into useable oils. The regenerated carbon monoxide by-product can be re-routed back to the combustion area of the combustion chamber and reused, or it can be used in whole or in part in some separate application, even as a commercial fuel in other industries. Heat that is released from the petroleum and carbon monoxide by-product during the cooling phase can be recovered, transferred back to the combustion chamber and reused. The combustion chamber is preferably sealed, enabling users to combust relatively pure oxygen in the combustion phase (instead of ambient air) to thereby reduce, and perhaps even eliminate, nitrogen and other non-essential gases from accumulating and inhibiting the combustion/reaction cycle.

An advantage of this process is that no carbon dioxide, nitrogen, or nitrous oxide gases are released into the atmosphere. The fact that the regenerated carbon monoxide gases is of a quality that can be used as a useful fuel results in avoiding exhaust gases being emitted into the atmosphere.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE INVENTION

Figure 1:
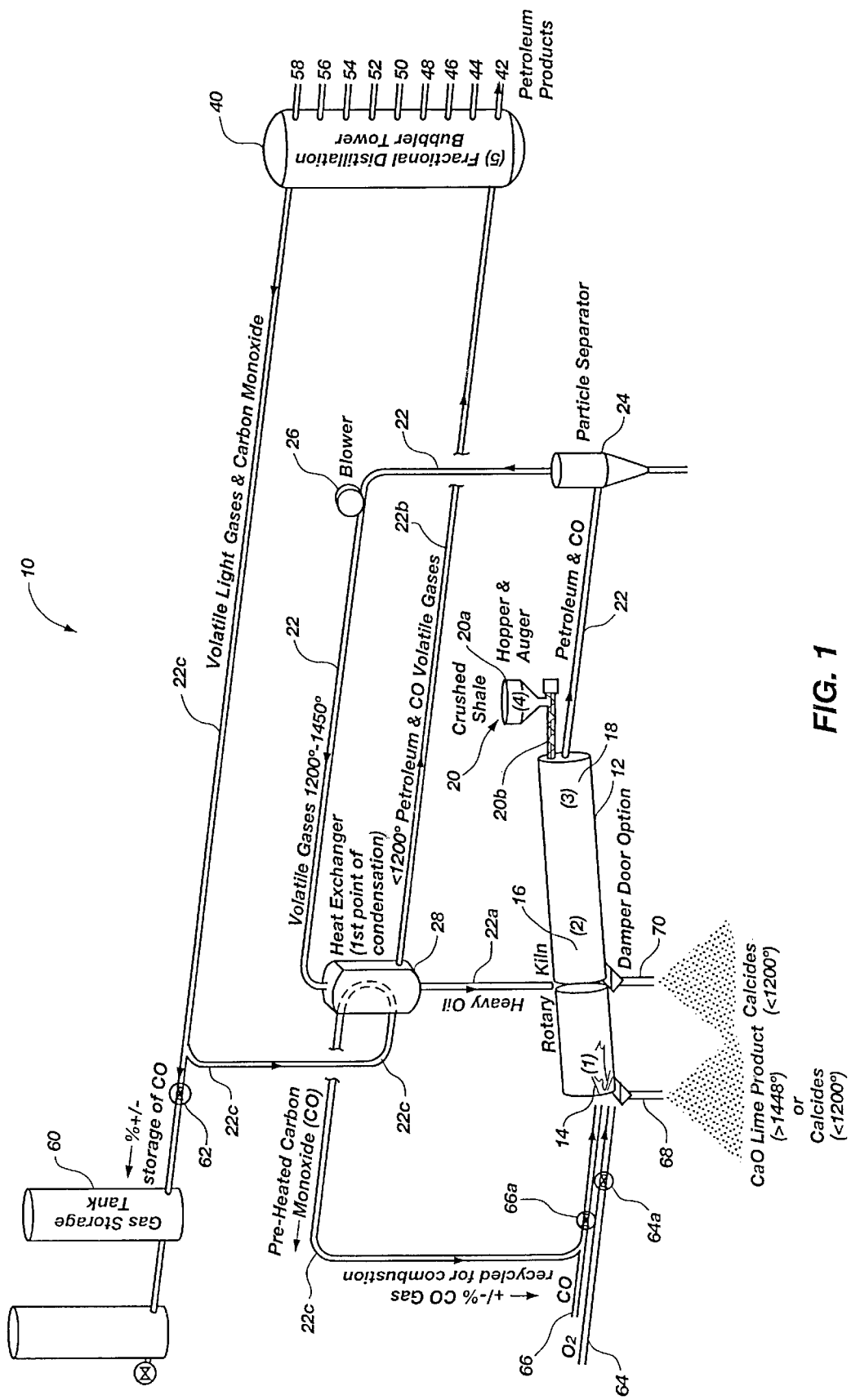
FIG. 1 is a schematic view of an apparatus for extracting oil from oil shale, made in accordance with the principles of the present invention

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Applicant has discovered that oil can be produced from oil shale more efficiently by using a relatively sealed combustion and reaction process, recovering and reusing heat, and by regenerating most, if not all, of the reactants in the combustion process. Furthermore, useable carbon monoxide can be produced or regenerated effectively, for use as a utility gas.

Referring now to FIGURE 1, there is shown a schematic view of an apparatus for reducing oil shale into useable oil, carbon monoxide, calcites, and limes, the apparatus being designated generally at 10. The operation of the apparatus 10 will first be described briefly in terms of its key, basic features, after which more detail pertaining to those features will be provided.

The apparatus 10 includes a combustion chamber 12, which may also be referred to herein as a "combustion and regeneration chamber 12." The combustion chamber 12 is preferably a rotary kiln, such as a rotating pyrolysis drum retort, but may alternatively comprise any suitable retort such as a static mixer retort, a gravity flow retort, a fluid bed retort, a screw conveyor retort, or some other type of retort useable in accordance with the principles of the invention. The combustion chamber 12 preferably includes a combustion zone 14, a gas generation zone 16, and a destructive distillation zone 18.

A crushed shale source 20 preferably comprises a hopper 20a and an auger conveyor 20b, for transporting crushed oil shale from the hopper 20a into the destructive distillation zone 18 of the combustion chamber 12.

A movement path 22 is disposed in communication with the combustion chamber 12. The path 22 is preferably a pipe or some suitable conduit capable of transporting fluids. The movement path 22 preferably extends from the combustion chamber 12 to a particle separator 24, then to a blower 26, then to a heat exchanger 28, at which point the path 22 preferably separates into a heavy oil path 22a, which preferably extends from the heat exchanger 28 back to the combustion and regeneration chamber 12, and a cooled effluent gas path 22b, which preferably extends from the heat exchanger 28 to a fractional separator 40. The fractional separator 40 is preferably a fractional distillation tower. A light gas path 22c preferably extends from the fractional distillation tower 40 to a gas storage tank 60 and to the heat exchanger 28, by operation of a control valve 62 as shown. The light gas path 22c is preferably routed through the heat exchanger 28 then preferably back into the combustion zone 14 of the combustion chamber 12. Discharge lines 68 and 70 extend from the combustion chamber 12.

In operation, relatively pure oxygen ($O_2$), and carbon monoxide (CO), are transported into the combustion zone 14 of the combustion chamber 12 by supply lines 64 and 66, respectively, and the flow of said gases is controlled by valves 64a and 66a, respectively. The relatively pure oxygen and the carbon monoxide are combusted in the combustion zone 14 to form carbon dioxide ($CO_2$), and the combustion is preferably controlled to produce heat having a temperature of at least 1200° F. (Fahrenheit). At the same time, crushed oil shale is transported into the destructive distillation zone 18 of the combustion chamber 12.

The combustion so described, along with the supply of crushed oil shale into the destructive distillation zone 18, causes simultaneous reactions within the combustion chamber 12 as part of a recurring combustion/reaction cycle, in which the heat of the combustion breaks down the crushed oil shale to release the petroleum hydrocarbons contained in the shale, leaving retorted oil shale containing carbon residue which is exposed to the carbon dioxide to react and regenerate a carbon monoxide product, leaving spent oil shale, preferably to be discharged as a calcite ($CaCO_3$) or as a calcium oxide lime (CaO) (depending upon the temperatures present in the chamber 12, and in particular in the destructive distillation zone 18) from discharge lines 68 and 70 extending from the combustion chamber 12. The heat of the combustion releases other volatile gases from the crushed oil shale, along with the petroleum hydrocarbons.

The released petroleum hydrocarbons, other volatile gases, and the carbon monoxide product, are transported from the combustion chamber 12 along the movement path 22 through the particle separator 24, which removes particulates from the gaseous stream. When the petroleum hydrocarbons and the carbon monoxide product reach the heat exchanger 28, the heat exchanger withdraws heat from them and transfers that heat to re-routed carbon monoxide product and other light gases traveling along light gas path 22c as shown.

In the heat exchanger 28, a "higher temperature" cooling is made, or a "partial cooling," by removing some, but not all, of the heat from the released petroleum hydrocarbons, carbon monoxide by-product, and other volatile gases. It is preferable to transport only the lighter gases to the fractional distillation tower 40, and since the heaviest gases condense first at higher temperatures than the condensation point of the lighter gases, the heat exchanger 28 and associated controls are adapted to remove enough heat from the gases to cause the heavier gases to condense yet still maintain the lighter gases in gaseous form. As illustrated schematically in FIG. 1, the lighter gases and carbon monoxide being re-routed along light gas path 22c operate to absorb heat from the hot gases flowing along movement path 22. There is accordingly a limit to how much heat can be transferred, and if it is desired to remove more heat from the hot gases flowing along movement path 22 that the lighter gases from along light gas path 22c are capable of removing, a coolant may be required, such as water or any suitable cooling compound, in order to remove more of the heat. It is also to be understood that a user of the apparatus 10 may choose to cool the gases sufficiently to cause not only the heavier gases to condense, but also some of the lighter hydrocarbons as well, and pass them back to the combustion chamber 12 in condensed form along the heavy oil path 22a to break them down further through heat-cracking (defined below).

The heaviest gases condense into a heavy oil that is transported from the heat exchanger 28 along the heavy oil path 22a back into the combustion chamber, preferably at or near the combustion zone 14, in order to reheat and "crack" the heavy oil as the term "crack" is understood in the field to refer to the breaking down of heavy oil into carbons and lighter hydrocarbons. The lighter hydrocarbons produced by "cracking" the heavy oil may be produced in gaseous or liquid form, depending on the circumstances. The lighter petroleum hydrocarbons, along with the regenerated carbon monoxide by-product, are passed from the heat exchanger 28 along the cooled effluent gas path 22b, still in gaseous form, to the fractional separator 40 to undergo "lower temperature cooling" than is accomplished in the heat exchanger 28. The light petroleum hydrocarbons are thereby cooled and processed into useable oils as petroleum products, by any suitable manner known to those skilled in the art of oil processing by a fractional distillation tower.

Accordingly, in the fractional distillation tower 40, cooled effluent gas transported to the tower 40 along the path 22b, is cooled even more in the tower 40, and separated into fractions of light hydrocarbon gases (along with the regenerated carbon monoxide by-product), light shale oil, and middle shale oil, the oils being separable in a range of several different densities. The fractions of light and middle shale oils are discharged from the tower 40 through lines 42, 44, 46, 48, 50, 52, 54, 56, and 58, in accordance with their decreasing densities, respectively. Accordingly, the heavier shale oils are generally discharged from the lower lines 42, 44, 46, 48 and 50, for example, and the lighter shale oils are generally discharged from the higher lines 52, 54, 56 and 58. The fractions of light hydrocarbon gases, and the carbon monoxide by-product, are discharged into light gas path 22c, which preferably extends from the tower 40 to a gas storage tank 60 and to the heat exchanger 28, by operation of a control valve 62 as shown. The light hydrocarbon gases and the carbon monoxide by-product may be transported from the storage tank 60, or directly from the light gas path 22c, as a utility gas for other commercial purposes in other industries.

The exposure of retorted oil shale to heated carbon dioxide in the combustion chamber 12 operates to utilize the retorted oil shale as a carbon source for regenerating carbon monoxide as described above. However, although oil shale is the preferred material for use in the inventive processes described herein, the phrase "carbon source" as used herein shall refer broadly to any carbon containing material capable of reacting with carbon dioxide to produce carbon monoxide. Some examples of a carbon source include oil shale, retorted oil shale, tar sand, retorted tar sand, coal, lignite, and the like.

Those having ordinary skill in the art will recognize that other carbon containing materials could also operate as a "carbon source" under the above definition. Therefore, the phrase "carbon source" as used herein is limited only by functionality, and is in reference to any carbon containing material that can react with carbon dioxide to form carbon monoxide, including the specific examples listed above and any others not listed but that are capable of functioning in the manner described.

The cycle of simultaneous combustion and reaction occurring in the different zones 14, 16 and 18 in the combustion chamber 12 as described above, can be represented stoichiometrically as follows:

| | |
|---|---|
| (1) (oxidation) $2CO + O_2 \rightarrow 2CO_2$ | +135,200 calories per unit of $O_2$ |
| (2) (reduction) $2CO_2 + 2C \rightarrow 4CO$ | −81,600 calories per unit of original $O_2$ from reaction (1). |
| Total heat/energy produced: | +53,600 calories per unit of original $O_2$ from reaction (1). |

It is seen from the above that reaction (1) is exothermic, while reaction (2) is endothermic. Reaction (2) assumes that there is a sufficient amount of carbon (C) to react with all of the carbon dioxide ($CO_2$) produced in reaction (1), in which case it is noted that the amount of the carbon monoxide by-product of reaction (2) would be twice the amount of carbon monoxide supplied originally as part of reaction (1) above. Of course, if a lesser amount of carbon (C) is supplied to the combustion chamber 12, then the proportions represented above would be different.

The total energy exhausted by the two-step combustion reaction cycle above amounts to +53,600 calories per unit of oxygen ($O_2$), which is the result of the +135,200 calories per unit of oxygen ($O_2$) produce from the exothermic reaction (1) above, reduced by the −81,600 calories per unit of $O_2$ that is absorbed by the endothermic reaction (2).

The prior art combustion methods used in the destructive distillation of oil shale have utilized the combustion of carbon (C) and oxygen ($O_2$) in the ambient air. Carbon that is combusted with ambient air combusts at a much lower temperature than the combustion of carbon monoxide (CO)

with relatively pure oxygen ($O_2$) as utilized in accordance with the principles of the present invention. The prior art combustion reaction is illustrated as follows:

| | |
|---|---|
| C + $O_2$ (from ambient air) → $CO_2$ | +94,400 calories per unit $O_2$ in air |

It will be appreciated, by those having ordinary skill in the art, that the +135,200 calories per unit of oxygen ($O_2$) produced by burning carbon monoxide is a much higher heat of combustion than the +94,400 calories per unit of oxygen ($O_2$) (from ambient air) produced by the prior art combustion reaction above. Applicant prefers to utilize the excess heat by absorbing it directly into the endothermic follow-up reaction (2) above by heating the oil shale to regenerate carbon monoxide (CO) and calcining the calcite in the retorted oil shale residing in the destructive distillation zone 18, without using a heat-transferring medium and the related heat-loss inefficiencies thereof, to regenerate the carbon monoxide (CO) product. Accordingly, the "hot carbon dioxide" ($CO_2$) produced by reaction (1) above is a necessary part of one aspect of the invention.

Applicant discovered the benefit of combusting carbon monoxide (CO) with pure oxygen because that reaction combusts at a higher temperature than carbon (C) combusts with ambient air or which oxygen in an excessive carbonous environment, and combustion of carbon monoxide with pure oxygen thus liberates more heat per unit of oxygen ($O_2$) consumed than does carbon (C), and because the carbon dioxide ($CO_2$) by-product can be used to regenerate carbon monoxide (CO) while consuming the carbon residue normally remaining as retorted oil shale. The purpose of this approach is to recover the heat of combustion as well as to produce carbon monoxide. The process is efficient and excess heat is put to good use by the follow-up reaction (2) above. The prior art processes are disadvantageous because they operate the combustion phase at some location remote from the heat chamber in which the oil shale is transported, the heat of combustion being transmitted to the oil shale by a heat transferring medium through a conduit, which is less efficient and causes heat to be lost.

Further, it will be appreciated that it is in accordance with the principles of the present invention to utilize the apparatus 10 (or portions equivalent to it) to produce carbon monoxide regardless of whether useable oil is also produced. For example, carbon monoxide may be produced, without producing oil, by supplying coal and an alternative source of carbon dioxide[1] into the combustion chamber. For example, by using dolomite ($CaMg(CO_3)_2$) as the alternative source of carbon monoxide, when subjected to the high temperatures in the combustion chamber 12 the dolomite would release carbon dioxide, and that carbon dioxide would react with carbon contained by the coal, as would the carbon dioxide produced by the combustion of carbon monoxide and oxygen, to produce carbon monoxide. The alternative source of carbon dioxide would be used as an energy-balancing imperative (just as the calcite in the oil shale is used), in that some of the heat energy produced by the combustion would be absorbed by the dolomite by heating the dolomite to release the carbon dioxide and causing that carbon dioxide product to react with the carbon contained in the coal.

[1] Any suitable alternative source of carbon dioxide may be utilized, such as by directly supplying relatively pure carbon dioxide, or by utilizing carbon dioxide that is released in a chemical reaction as is known in conjunction with dolomite ($CaMg (CO_3)_2$).

It is thus within the scope of the present invention to regenerate carbon monoxide in any suitable manner desired. For example, a method of generating carbon monoxide in accordance with the principles of the present invention, in a most basic form, could involve the following part:

(a) reacting a hot carbon dioxide with a carbon source to thereby produce carbon monoxide.

A method of regenerating carbon monoxide in accordance with the principles of the present invention could involve the following parts:

(a) combusting oxygen and a first source of carbon monoxide to thereby form a hot carbon dioxide by-product; and (b) conveying the hot carbon dioxide by-product into contact with a carbon source within a reaction chamber, wherein said hot carbon dioxide reacts with said carbon source to regenerate a carbon monoxide by-product.

The method above may be further augmented with the following part:

(c) transporting the carbon monoxide to a storage tank or to a work site for use in a process at said work site.

The method above may be still further augmented, wherein part (b) further comprises producing a carbon monoxide by-product that is approximately twice the volume of carbon monoxide utilized in the combusting of carbon monoxide from said first source of carbon monoxide in part (a).

The method above may be still further augmented, wherein part (a) further comprises combusting relatively pure oxygen and a first source of carbon monoxide to thereby form the hot carbon dioxide by-product.

The method above may be additionally augmented, wherein the carbon source of part (b) comprises coal.

It is to be understood that the phrase "conveying the hot carbon dioxide by-product into contact with a carbon source within a reaction chamber," in part (b) of the method above, could be accomplished by the apparatus 10, or any suitable modification thereof. For example, the combustion of carbon monoxide and relatively pure oxygen could be accomplished at some location separate and remote from the chamber 12, and the hot carbon dioxide by-product thereafter conveyed into the chamber 12, making it essentially a reaction chamber and not a combustion chamber.

As noted herein previously, the combustion (reaction (1) above) is preferably controlled to produce heat having a temperature of at least 1200° F. (Fahrenheit). It will be appreciated that the actual temperature of the combustion, and of the carbon dioxide ($CO_2$) by-product, can be controlled despite the heat energy being produced by the combustion, simply by controlling the amount of carbon monoxide (CO) supplied for the combustion step (1), because combustion requires oxygen ($O_2$) and the amount of carbon monoxide that can be burned in a reaction with oxygen is thus limited by the amount of oxygen present.

Accordingly, if more carbon monoxide is supplied to the combustion chamber 12 than can react with the amount of the oxygen that is supplied, part of the carbon monoxide will remain unreacted and will therefore not burn. Therefore, if a sufficiently larger amount of carbon monoxide is supplied, it will remain at its lower, unreacted temperature to thereby "dilute" the temperature of the heat of the combustion. Accordingly, the overall temperature inside the reaction chamber 12, at the combustion zone 14 and elsewhere, can be reduced by increasing the amount or rate of carbon monoxide being supplied, and vice versa.

More specifically, one aspect of the invention is to reduce the temperature of the combustion zone 14 by increasing the carbon monoxide supply rate relative to the oxygen supply rate, or alternatively by decreasing the oxygen supply rate. Another aspect of the invention is to increase the temperature of the combustion zone 14 by reducing the carbon monoxide supply rate relative to the oxygen supply rate, or by increasing the oxygen supply rate. Accordingly, users have the option to increase or decrease the temperature, and total heat usage, of the apparatus 10, in these manners.

It was mentioned above that spent oil shale is preferably discharged from the combustion chamber 12 as a calcite ($CaCO_3$) or as a calcium oxide lime (CaO) from discharge lines 68 and 70 extending from the combustion chamber 12, depending upon the temperatures present in the chamber 12, and in particular in the destructive distillation zone 18. More specifically, it is noted that calcites can be produced as part of the combustion step, if the temperature within the combustion chamber is maintained low enough. It is presently understood by applicant that exposing oil shale to a high-temperature heat that is less than 1448° F., at standard atmospheric pressure, will reduce the oil shale to a calcite. A further aspect of the invention, in accordance with applicant's present understanding, is that the oil shale will be transformed to a calcium oxide lime product if the temperature maintained in the destructive distillation zone 18 is greater than 1448° F., at standard atmospheric pressure. Controlling the temperatures present within the combustion chamber 12, therefore, is an important aspect of the present invention in choosing whether to transform the spent oil shale into a calcite or a calcium oxide lime. The calcite or the calcium oxide lime can be put to many constructive, industrial uses, such as in producing cement.

Discharge lines 68 and 70. particle separator 24, and lines 42, 44, 46, 48, 50, 52, 54, 56, and 58 as shown in the diagram, are sometimes also referred to as discharge points. Similarly auger conveyor 20b is sometimes referred to as an oil shale entrance point.

In accordance with the features and combinations described above, a preferred method of extracting oil from oil shale includes the following parts:

(a) producing combustion within a combustion chamber;

(b) transporting oil shale into the combustion chamber; and (c) heating the oil shale by exposing it directly to the heat from the products of the combustion, without aid of an intervening heat-transferring medium, to thereby heat the oil shale to a temperature sufficient to release oil therefrom.

The phrase "without aid of an intervening heat-transferring medium" shall refer broadly to the concept of exposing the oil shale to the heat produced by the combustion of oxygen and carbon monoxide and to hot carbon dioxide which is the product of that combustion, without an intervening element operating to (i) withdraw heat from the combusting gases and (ii) either dispense the heat to the oil shale or transport heated gases from a combustion chamber to a retort chamber. It is to be understood that although the gases produced by the combustion phase of the present invention serve to transport heat within the chamber 12, said gases would not constitute an "intervening heat-transferring medium" relative to the combustion or the oil shale, as that phrase is intended, because those gases are either part of the combustion itself or are a product of the combustion.

An example of an "intervening heat-transferring medium" would include the use of a solid heat-carrying material, such as spent oil shale, spent dried sludge, clay pellets, or metal pellets, which are heated and then moved into contact with oil shale (preferably by conveying the heat-carrying material through a heat carrier line at high temperatures and discharged from the line into the chamber containing the oil shale). Another example would be a heat carrier line itself, separate from the retort chamber, for conveying a heat carrier (whether the heat carrier is a solid or a gas) from a combustion chamber to a separate retort chamber, in which a primary purpose of the line is simply to transport the heat carrier for communication with the oil shale. The use of an intervening heat-transferring medium is described, for example, in U.S. Pat. No. 4,670,104 (granted Jun. 2, 1987 to Taylor), which is incorporated herein by reference.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of extracting petroleum hydrocarbons from oil shale, said method comprising:

(a) transporting oxygen, and a first source of carbon monoxide, into a combustion chamber;

(b) transporting oil shale into the combustion chamber;

(c) combusting the oxygen and the carbon monoxide as part of a combustion cycle to form carbon dioxide therefrom and to heat the oil shale sufficiently to release petroleum hydrocarbons from said oil shale; and (d) placing the combustion chamber into communication with an enclosed gas movement path along which the first source of carbon monoxide is conveyed, such that said enclosed gas movement path, coupled with the use of oxygen, collectively operates to minimize or eliminate aggregation of gases that are nonessential to the combustion cycle.

2. The method of claim 1, wherein all portions along the enclosed gas movement path are closed off from communication to atmosphere except for discharge points and oil shale entrance points.

3. A method of extracting petroleum hydrocarbons from oil shale, said method comprising:

(a) transporting oxygen, and a first source of carbon monoxide, into a combustion chamber;

(b) transporting oil shale into the combustion chamber;

(c) combusting the oxygen and the carbon monoxide as part of a combustion cycle to form carbon dioxide therefrom and to heat the oil shale sufficiently to release petroleum hydrocarbons from said oil shale;

(d) placing the combustion chamber into communication with an enclosed gas movement path along which the first source of carbon monoxide is conveyed, such that said enclosed gas movement path, coupled with the use of oxygen, collectively operates to minimize or eliminate aggregation of gases that are nonessential to the combustion cycle;

(e) separating the petroleum hydrocarbons from carbon residue of the oil shale and transporting the petroleum hydrocarbons out of the combustion chamber; and (f) exposing the carbon residue to the carbon dioxide to thereby regenerate carbon monoxide.

4. The method of claim 3, wherein parts (c) and (d) further comprise substantially sealing the combustion chamber, and placing the combustion chamber into communication with a substantially sealed gas movement path along which the carbon monoxide is conveyed.

5. The method of claim 3, further comprising:
(e) separating the petroleum hydrocarbons from carbon residue of the oil shale, transporting the petroleum hydrocarbons out of the combustion chamber, and cooling and processing said petroleum hydrocarbons into useable oils.

6. The method of claim 3, further comprising:
(e) separating the petroleum hydrocarbons from carbon residue of the oil shale, transporting the petroleum hydrocarbons out of the combustion chamber, and removing particulates from said petroleum hydrocarbons.

7. The method of claim 3, further comprising:
(e) separating the petroleum hydrocarbons from carbon residue of the oil shale and exposing said petroleum hydrocarbons to a conduit in which a subatmospheric pressure resides to thereby transport said petroleum hydrocarbons out of the combustion chamber and through said conduit.

8. The method of claim 7, wherein part (e) further comprises utilizing a blower to move gases within the conduit.

9. The method of claim 3, wherein the reaction of part (f) produces spent oil shale by utilizing the carbon as a reactant, said method further comprising:
(g) heating the spent oil shale sufficiently to produce a by-product therefrom selected from the group consisting of calcite and calcium oxide lime.

10. A method of extracting petroleum hydrocarbons from oil shale, said method comprising:
(a) transporting oxygen, and a first source of carbon monoxide, into a combustion chamber;
(b) transporting oil shale into the combustion chamber;
(c) combusting the oxygen and the carbon monoxide as part of a combustion cycle to form carbon dioxide therefrom and to heat the oil shale sufficiently to release petroleum hydrocarbons from said oil shale;
(d) placing the combustion chamber into communication with an enclosed gas movement path along which the first source of carbon monoxide is conveyed, such that said enclosed gas movement path, coupled with the use of oxygen, collectively operates to minimize or eliminate aggregation of gases that are nonessential to the combustion cycle; and
(e) separating the petroleum hydrocarbons from carbon residue of the oil shale, transporting the petroleum hydrocarbons out of the combustion chamber, cooling said petroleum hydrocarbons sufficiently to cause relatively heavy oils to condense from a portion of said petroleum hydrocarbons and leaving a remainder of uncondensed petroleum hydrocarbons, transporting the condensed heavy oils back into the combustion chamber, and cooling and processing the remainder of uncondensed petroleum hydrocarbons to thereby form useable oils therefrom.

11. A method of extracting petroleum hydrocarbons from oil shale, said method comprising:
(a) producing combustion within a combustion chamber;
(b) transporting oil shale into the combustion chamber;
(c) heating the oil shale by exposing it directly to heat from products of the combustion, without aid of an intervening heat-transferring medium, to thereby heat the oil shale to a temperature sufficient to release petroleum hydrocarbons therefrom, leaving a carbon-containing residue from the oil shale; and
(d) separating the petroleum hydrocarbons from carbon residue of the oil shale, transporting the petroleum hydrocarbons out of the combustion chamber, cooling said petroleum hydrocarbons sufficiently to cause relatively heavy oils to condense from a portion of said petroleum hydrocarbons and leaving a remainder of uncondensed petroleum hydrocarbons, transporting the condensed heavy oils back into the combustion chamber, and cooling and processing the remainder of uncondensed petroleum hydrocarbons to thereby form useable oils therefrom.

12. The method of claim 11, wherein part (a) further comprises producing carbon dioxide by combusting oxygen and carbon monoxide together, and wherein part (c) further comprises exposing the carbon-containing residue to a carbon dioxide product of the combustion produced in part (a) to thereby react the carbon in said residue with said carbon dioxide to produce carbon monoxide.

13. The method of claim 12, wherein part (c) further comprises exposing the oil shale to a carbon dioxide product of the combustion, said carbon dioxide product having a temperature of at least 1200° Fahrenheit.

14. The method of claim 11, further comprising:
(e) exposing the carbon residue to carbon dioxide to thereby regenerate carbon monoxide.

15. The method of claim 11, wherein parts (a), (b) and (c) further comprise supplying carbon monoxide to the combustion chamber, substantially sealing the combustion chamber, and placing the combustion chamber into communication with a substantially sealed gas movement path along which the carbon monoxide is conveyed.

16. The method of claim 11, further comprising:
(e) removing particulates from said petroleum hydrocarbons.

17. The method of claim 11, further comprising:
(e) exposing said petroleum hydrocarbons to a conduit in which a subatmospheric pressure resides to thereby cause the transporting of said petroleum hydrocarbons out of the combustion chamber and into said conduit.

18. The method of claim 17, wherein part (e) further comprises utilizing a blower to move gases within the conduit.

19. The method of claim 12, wherein the reaction of carbon dioxide with the carbon-containing residue produces spent oil shale by utilizing the carbon as a reactant, said method further comprising:
(d) heating the spent oil shale sufficiently to produce a by-product therefrom selected from the group consisting of calcite and calcium oxide lime.

20. The method of claim 13, wherein part (c) further comprises exposing the oil shale to a carbon dioxide product of the combustion, said carbon dioxide product having a temperature of at least 1448° Fahrenheit.

21. A method of extracting petroleum hydrocarbons from oil shale, said method comprising:
(a) transporting oxygen into a combustion chamber;
(b) transporting carbon monoxide along a movement path that passes through a heat exchange area and into the combustion chamber;
(c) transporting oil shale into the combustion chamber;
(d) combusting the oxygen and the carbon monoxide within the combustion chamber to thereby heat the oil shale sufficiently to release petroleum hydrocarbons from said oil shale;
(e) transporting the petroleum hydrocarbons from the combustion chamber to the heat exchange area; and
(f) transferring heat from the petroleum hydrocarbons to the carbon monoxide that is traveling along the movement path to thereby cool the petroleum hydrocarbons and pre-heat the traveling carbon monoxide before said traveling carbon monoxide enters the combustion chamber, thereby completing a heat-cycle path that begins and ends in the combustion chamber.

22. The method of claim 21, wherein part (d) further comprises combusting the oxygen and the carbon monoxide to thereby form carbon dioxide, and wherein the release of the petroleum hydrocarbons from the oil shale reduces said oil shale to a carbon-containing residue, said method further comprising:
(g) exposing the carbon-containing residue to the carbon dioxide to thereby regenerate carbon monoxide.

23. The method of claim 21, wherein parts (a) and (b) further comprise substantially sealing the combustion chamber, and placing the combustion chamber into a substantially sealed communication with the movement path along which the carbon monoxide is conveyed.

24. The method of claim 21, wherein part (e) further comprises separating the petroleum hydrocarbons from carbon residue of the oil shale, transporting the petroleum hydrocarbons out of the combustion chamber, and cooling and processing said petroleum hydrocarbons into useable oils.

25. The method of claim 21, wherein part (e) further comprises separating the petroleum hydrocarbons from carbon residue of the oil shale, transporting the petroleum hydrocarbons out of the combustion chamber, and removing particulates from said petroleum hydrocarbons.

26. The method of claim 21, wherein part (e) further comprises separating the petroleum hydrocarbons from carbon residue of the oil shale and exposing said petroleum hydrocarbons to a conduit in which a subatmospheric pressure resides to thereby transport said petroleum hydrocarbons out of the combustion chamber and through said conduit.

27. The method of claim 26, wherein part (e) further comprises utilizing a blower to move gases within the conduit.

28. The method of claim 22, wherein the reaction of part (g) produces spent oil shale by utilizing the carbon as a reactant, said method further comprising:
(h) heating the spent oil shale sufficiently to produce a by-product therefrom selected from the group consisting of calcite and calcium oxide lime.

29. The method of claim 21, wherein part (e) further comprises separating the petroleum hydrocarbons from carbon residue of the oil shale, transporting the petroleum hydrocarbons out of the combustion chamber, cooling said petroleum hydrocarbons sufficiently to cause relatively heavy oils to condense from a portion of said petroleum hydrocarbons and leaving a remainder of uncondensed petroleum hydrocarbons, transporting the condensed heavy oils back into the combustion chamber, and cooling and processing the remainder of uncondensed petroleum hydrocarbons to thereby form useable oils therefrom.

30. A method of extracting petroleum hydrocarbons from oil shale, said method comprising:
(a) transporting oxygen and a first carbon monoxide into a combustion chamber;
(b) transporting oil shale into the combustion chamber;
(c) combusting the oxygen and the carbon monoxide in a combustion area of the chamber as part of a combustion cycle to form carbon dioxide therefrom and to heat the oil shale sufficiently to release petroleum hydrocarbons from said oil shale; and
(d) exposing a carbon source within the combustion chamber to the carbon dioxide to thereby form a second, carbon monoxide product.

31. The method of claim 30, further comprising:
(e) transporting the carbon monoxide product from the combustion chamber and routing it back to the combustion area as part of part (a) to thereby combust said carbon monoxide product with the oxygen as part of the combustion cycle of part (c).

32. The method of claim 30, further comprising:
(f) separating the petroleum hydrocarbons from carbon residue of the oil shale and transporting the petroleum hydrocarbons out of the combustion chamber, thereby leaving the carbon residue in the combustion chamber to serve as the carbon source for reacting with the carbon dioxide in part (d).

33. The method of claim 30, further comprising:
(g) transporting the carbon monoxide product from the combustion chamber and routing it back to the combustion area as part of part (a) to thereby combust said carbon monoxide product with the oxygen as part of the combustion cycle of part (c), and to thereby utilize the carbon residue from the oil shale as a useful reactant in the cycle.

34. The method of claim 30, further comprising:
(h) placing the combustion chamber into communication with a substantially sealed gas movement path along which the first carbon monoxide is conveyed, such that the use of relatively pure oxygen operates to minimize or eliminate aggregation of gases that are nonessential to the combustion cycle.

35. The method of claim 30, wherein part (c) further comprises producing a heated carbon dioxide product by said combusting of the oxygen and the carbon monoxide and exposing the oil shale to said heated carbon dioxide.

36. The method of claim 35, wherein part (c) further comprises producing the heated carbon dioxide such that it has a temperature of at least 1200° Fahrenheit when the oil shale is exposed to it.

37. A method of extracting petroleum hydrocarbons from oil shale, said method comprising:
(a) transporting oil shale into a combustion chamber;
(b) supplying oxygen and carbon monoxide to the combustion chamber;
(c) combusting the oxygen and carbon monoxide in a combustion area within the combustion chamber and at a temperature sufficient to cause petroleum hydrocarbons to be released from the oil shale and leave a carbon-containing residue from said oil shale, to thereby generate a recurring combustion/reaction cycle wherein the combustion of the carbon monoxide and the oxygen generates carbon dioxide and the carbon dioxide reacts with the carbon-containing residue to regenerate a carbon monoxide product.

38. The method of claim 37, further comprising:
(d) transporting the carbon monoxide product to the combustion area to thereby utilize said carbon monoxide product in the combustion part of part (c).

39. The method of claim 37, wherein the reaction of the carbon dioxide with the carbon residue to regenerate carbon monoxide in part (c) is an endothermic reaction such that heat energy is absorbed from the carbon dioxide as it reacts with the carbon residue, and such that said carbon dioxide has a higher temperature and the regenerated carbon monoxide has a lower temperature as a result of said endothermic reaction.

40. The method of claim 37, wherein parts (a) and (b) further comprise substantially sealing the combustion chamber, and placing the combustion chamber into a substantially sealed communication with a movement path along which the carbon monoxide is supplied to said combustion chamber.

41. The method of claim 37, wherein part (c) further comprises separating the petroleum hydrocarbons from the carbon-containing residue of the oil shale, transporting the petroleum hydrocarbons out of the combustion chamber, and cooling and processing said petroleum hydrocarbons into useable oils.

42. The method of claim 37, wherein part (c) further comprises separating the petroleum hydrocarbons from the carbon-containing residue of the oil shale, transporting the petroleum hydrocarbons out of the combustion chamber, and removing particulates from said petroleum hydrocarbons.

43. The method of claim 37, wherein part (c) further comprises separating the petroleum hydrocarbons from the carbon-containing residue of the oil shale and exposing said petroleum hydrocarbons to a conduit in which a subatmospheric pressure resides to thereby transport said petroleum hydrocarbons out of the combustion chamber and through said conduit.

44. The method of claim 43, wherein part (c) further comprises utilizing a blower to move gases within the conduit.

45. The method of claim 37, wherein the reaction of carbon dioxide with carbon in the carbon-containing residue in part (c) produces spent oil shale by utilizing the carbon as a reactant, said method further comprising:
(d) heating the spent oil shale sufficiently to produce a by-product therefrom selected from the group consisting of calcite and calcium oxide lime.

46. The method of claim 37, wherein part (c) further comprises separating the petroleum hydrocarbons from the carbon-containing residue of the oil shale, transporting the petroleum hydrocarbons out of the combustion chamber, cooling said petroleum hydrocarbons sufficiently to cause relatively heavy oils to condense from a portion of said petroleum hydrocarbons and leaving a remainder of uncondensed petroleum hydrocarbons, transporting the condensed heavy oils back into the combustion chamber, and cooling and processing the remainder of uncondensed petroleum hydrocarbons to thereby form useable oils therefrom.

47. A method of extracting petroleum hydrocarbons from oil shale, said method comprising:
(a) supplying oxygen, carbon monoxide, oil shale and a carbon source into a combustion chamber;
(b) combusting the oxygen and carbon monoxide within the combustion chamber to thereby produce a heat of combustion and form hot carbon dioxide, wherein the carbon dioxide reacts with the carbon source to produce a carbon monoxide product; and
(c) exposing the oil shale to the heat of combustion of the oxygen and carbon monoxide to thereby cause petroleum hydrocarbons to be released from the oil shale.

48. The method of claim 47, wherein part (a) further comprises supplying a first quantity of carbon monoxide into the combustion chamber, and supplying a quantity of the carbon source into the combustion chamber sufficient in amount to cause the reaction in part (b) of the carbon dioxide with said carbon source to produce a quantity of the carbon monoxide product that is greater than the first quantity of carbon monoxide.

49. The method of claim 48, wherein part (b) further comprises reacting substantially all of the carbon dioxide with the carbon source to thereby produce a quantity of the carbon monoxide product that is approximately two times the first quantity of carbon monoxide.

50. A method of regenerating carbon monoxide, said method comprising:
(a) supplying oxygen, a first source of carbon monoxide, and a carbon source into a combustion chamber; and
(b) combusting the oxygen and carbon monoxide within the combustion chamber to thereby form carbon dioxide, wherein the carbon dioxide reacts with the carbon source to produce a carbon monoxide product, all within the same combustion chamber.

51. The method of claim 50, wherein part (b) further comprises producing a carbon monoxide product that is approximately twice the volume of carbon monoxide utilized in the combusting of carbon monoxide from said first source of carbon monoxide.

52. The method of claim 50, wherein part (a) further comprises supplying dolomite into the combustion chamber, along with the oxygen, the first source of carbon monoxide, and the carbon source, and wherein part (b) further comprises subjecting the dolomite to high temperatures from the combustion to thereby cause said dolomite to release carbon dioxide and absorb heat.

53. The method of claim 52, wherein the carbon source comprises coal.

54. A method of extracting petroleum hydrocarbons from oil shale, said method comprising:
(a) supplying oxygen, carbon monoxide and oil shale into a combustion chamber;
(b) combusting the oxygen and carbon monoxide within the combustion chamber to thereby produce a heat of combustion and form heated carbon dioxide;
(c) exposing the oil shale to the combustion of the oxygen and carbon monoxide to thereby cause petroleum hydrocarbons to be released from the oil shale, and processing said petroleum hydrocarbons to thereby form oil;
wherein part (a) further comprises supplying the oxygen to the combustion chamber at an oxygen supply rate, and supplying the carbon monoxide to the combustion chamber at a carbon monoxide supply rate, and selectively modify a temperature of the heat of combustion by undertaking a step selected from the group consisting of (i) selectively modifying the carbon monoxide supply rate relative to the oxygen supply rate, and (ii) selectively modifying the oxygen supply rate relative to the carbon monoxide supply rate;
(d) separating the petroleum hydrocarbons from carbon residue of the oil shale and transporting the petroleum hydrocarbons out of the combustion chamber; and (e) exposing the carbon residue to the carbon dioxide to thereby regenerate carbon monoxide.

55. The method of claim 54, wherein part (a) further comprises reducing the temperature within the combustion chamber by increasing the carbon monoxide supply rate relative to the oxygen supply rate.

56. The method of claim 54, wherein part (a) further comprises increasing the temperature within the combustion chamber by reducing the carbon monoxide supply rate relative to the oxygen supply rate.

57. The method of claim 54, wherein part (a) further comprises increasing the temperature within the combustion chamber to greater than 1448° F., to thereby transform the oil shale into a calcium oxide lime after the petroleum hydrocarbons are released from said oil shale.

58. A method of extracting petroleum hydrocarbons from oil shale, said method comprising:
   (a) supplying oil shale to a combustion chamber;
   (b) producing an exothermic reaction within said combustion chamber to thereby release heat energy and heat the oil shale sufficiently to cause petroleum hydrocarbons to be released from said oil shale; and
   (c) producing an endothermic reaction within said combustion chamber to thereby absorb some of the heat energy produced in part (b).

59. A method of extracting petroleum hydrocarbons from oil shale, said method comprising:
   (a) transporting oil shale into a combustion chamber;
   (b) supplying oxygen and carbon monoxide to the combustion chamber;
   (c) combusting the oxygen and carbon monoxide in a combustion area within the combustion chamber and at a temperature sufficient to cause petroleum hydrocarbons to be released from the oil shale and leave a carbon-containing residue from said oil shale, to thereby generate a recurring combustion/reaction cycle wherein the combustion of the carbon monoxide and the oxygen generates carbon dioxide and the carbon dioxide reacts with the carbon-containing residue to regenerate a carbon monoxide product;
   (d) transporting the carbon monoxide product to the combustion area to thereby utilize said carbon monoxide product in the combustion part of part (c);
      wherein the reaction of the carbon dioxide with the carbon residue to regenerate carbon monoxide in part (c) is an endothermic reaction such that heat energy is absorbed from the carbon dioxide as it reacts with the carbon residue, and such that said carbon dioxide has a higher temperature and the regenerated carbon monoxide has a lower temperature as a result of said endothermic reaction;
      wherein parts (a) and (b) further comprise substantially sealing the combustion chamber, and placing the combustion chamber into a substantially sealed communication with a movement path along which the carbon monoxide is supplied to said combustion chamber;
      wherein part (c) further comprises separating the petroleum hydrocarbons from the carbon-containing residue of the oil shale, transporting the petroleum hydrocarbons out of the combustion chamber, removing particulates from said petroleum hydrocarbons, exposing said petroleum hydrocarbons to a conduit in which a subatmospheric pressure resides to thereby transport said petroleum hydrocarbons out of the combustion chamber and through said conduit, and cooling and processing said petroleum hydrocarbons into useable oils;
      wherein the reaction of carbon dioxide with carbon in the carbon-containing residue in part (c) produces spent oil shale by utilizing the carbon as a reactant, said method further comprising:
   (e) heating the spent oil shale sufficiently to produce a by-product therefrom selected from the group consisting of calcite and calcium oxide lime;
      wherein part (c) further comprises cooling said petroleum hydrocarbons sufficiently to cause relatively heavy oils to condense from a portion of said petroleum hydrocarbons and leaving a remainder of uncondensed petroleum hydrocarbons, transporting the condensed heavy oils back into the combustion chamber, and cooling and processing the remainder of uncondensed petroleum hydrocarbons to thereby form useable oils therefrom;
      wherein part (a) further comprises transporting oxygen into the combustion chamber;
      wherein part (b) further comprises transporting carbon monoxide along a movement path that passes through a heat exchange area, the method further comprising:
   (f) transferring heat from the petroleum hydrocarbons to carbon monoxide that is traveling along the movement path to thereby cool the petroleum hydrocarbons and pre-heat the traveling carbon monoxide before said traveling carbon monoxide enters the combustion chamber, thereby completing a heat-cycle path that begins and ends in the combustion chamber.

* * * * *